(12) United States Patent
Li et al.

(10) Patent No.: US 9,500,154 B2
(45) Date of Patent: Nov. 22, 2016

(54) ADAPTATION METHOD OF AN INJECTOR OF AN INTERNAL COMBUSTION ENGINE

(75) Inventors: Hui Li, Regensburg (DE); Matthias Scheid, Regensburg (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 828 days.

(21) Appl. No.: 13/885,891

(22) PCT Filed: Oct. 11, 2011

(86) PCT No.: PCT/EP2011/067746
§ 371 (c)(1),
(2), (4) Date: Aug. 5, 2013

(87) PCT Pub. No.: WO2012/065785
PCT Pub. Date: May 24, 2012

(65) Prior Publication Data
US 2013/0325298 A1    Dec. 5, 2013

(30) Foreign Application Priority Data

Nov. 16, 2010   (DE) .......................... 10 2010 043 989

(51) Int. Cl.
*F02D 41/30*     (2006.01)
*F02D 41/14*     (2006.01)
(Continued)

(52) U.S. Cl.
CPC ....... *F02D 41/3005* (2013.01); *F02D 41/1497* (2013.01); *F02D 41/2438* (2013.01);
(Continued)

(58) Field of Classification Search
CPC ................ F02D 41/1497; F02D 41/402; F02D 41/2438; F02D 41/2441
(Continued)

(56) References Cited

U.S. PATENT DOCUMENTS 5,699,253 A * 12/1997 Puskorius .............. G01M 15/11
                                                    701/110
6,755,176 B2 * 6/2004 Takeuchi ............ F02D 41/0085
                                                    123/299
(Continued)

FOREIGN PATENT DOCUMENTS

CN         1526930 A      9/2004     ............. F02D 37/02
CN         1576549 A      2/2005     ............. F02D 41/12
(Continued)

OTHER PUBLICATIONS

International Search Report and Written Opinion, Application No. PCT/EP2011/067746, 12 pages, Dec. 7, 2011.
(Continued)

*Primary Examiner* — Hieu T Vo
*Assistant Examiner* — Arnold Castro
(74) *Attorney, Agent, or Firm* — Slayden Grubert Beard PLLC

(57) ABSTRACT

An adaption method of an injector of an internal combustion engine, in which an actually injected fuel quantity is adapted to a target injection quantity, may include: actuating the injector using a test injection pulse in at least one segment of an injection cycle; detecting a change in the rotational speed signal due to the test injection pulse in the segment associated with the test injection pulse; and correcting the injected fuel quantity based on the detected change in the rotational speed signal, wherein the method is performed during a normal operating state of the internal combustion engine.

14 Claims, 6 Drawing Sheets

(51) Int. Cl.
*F02D 41/24* (2006.01)
*F02D 41/40* (2006.01)

(52) U.S. Cl.
CPC ......... *F02D 41/2467* (2013.01); *F02D 41/402* (2013.01); *Y02T 10/44* (2013.01)

(58) Field of Classification Search
USPC ........ 701/104, 110; 123/436, 299, 300, 480, 123/492; 73/114.05, 114.24
See application file for complete search history.

(56) References Cited

U.S. PATENT DOCUMENTS

| | | | |
|---|---|---|---|
| 6,792,912 B2 | 9/2004 | Kikuchi et al. | 123/294 |
| 6,907,861 B2 | 6/2005 | Asano et al. | 123/395 |
| 7,139,657 B2 | 11/2006 | Bouchain et al. | 701/104 |
| 7,269,500 B2* | 9/2007 | Cochet | F02D 41/1497 701/114 |
| 7,363,912 B2 | 4/2008 | Asano et al. | 123/436 |
| 2007/0112502 A1* | 5/2007 | Asano | F02D 41/1498 701/111 |
| 2008/0011273 A1* | 1/2008 | Birkner | F02D 41/0005 123/435 |
| 2009/0076707 A1* | 3/2009 | Sugiyama | F02D 41/123 701/103 |
| 2010/0168983 A1* | 7/2010 | Ruiz | F02D 41/1497 701/103 |
| 2011/0036329 A1* | 2/2011 | Jung | F02D 41/1497 123/456 |
| 2013/0024098 A1 | 1/2013 | Li et al. | 701/104 |

FOREIGN PATENT DOCUMENTS

| | | | | |
|---|---|---|---|---|
| DE | 10257686 A1 | 7/2004 | | F02D 41/12 |
| DE | 10305523 A1 | 8/2004 | | F02D 41/22 |
| DE | 102005052024 A1 | 5/2006 | | F02D 41/40 |
| DE | 102007000367 A1 | 1/2008 | | F02D 41/00 |
| DE | 102008041714 A1 | 4/2009 | | F02D 41/40 |
| DE | 102008043165 A1 | 4/2010 | | F02D 41/40 |
| DE | 102010014320 A1 | 10/2011 | | F02D 41/00 |
| WO | 2012/065785 A1 | 5/2012 | | F02D 41/14 |

OTHER PUBLICATIONS

Chinese Office Action, Application No. 201180055282.X, 11 pages, Apr. 23, 2015.

* cited by examiner

FIG 1A
Prior art
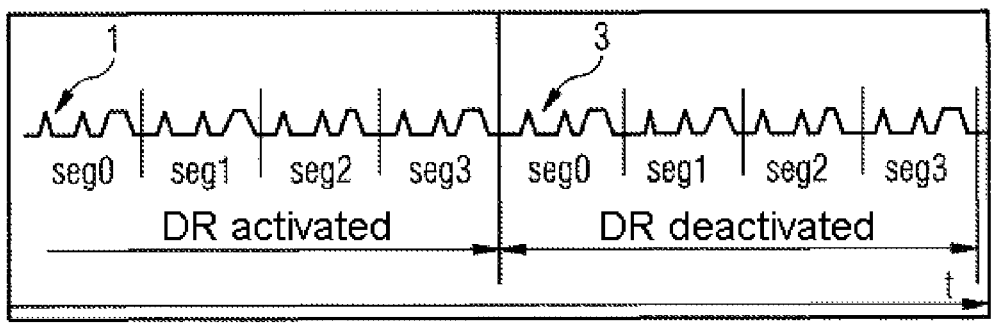
FIG 1B
Prior art
FIG 2A
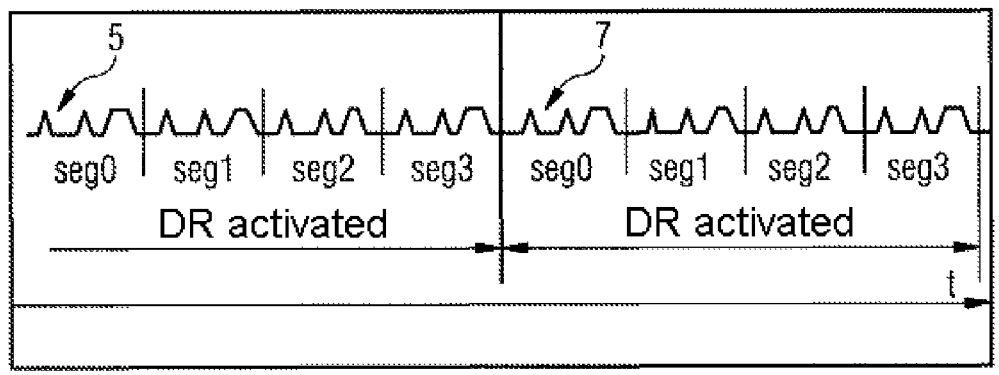
FIG 2B

ADAPTATION METHOD OF AN INJECTOR OF AN INTERNAL COMBUSTION ENGINE

CROSS-REFERENCE TO RELATED APPLICATIONS

This application is a U.S. National Stage Application of International Application No. PCT/EP2011/067746 filed Oct. 11, 2011, which designates the United States of America, and claims priority to DE Application No. 10 2010 043 989.4 filed Nov. 16, 2010, the contents of which are hereby incorporated by reference in their entirety.

TECHNICAL FIELD

The present disclosure relates to an adaptation method of an injector of an internal combustion engine, an injection device of an internal combustion engine and to an internal combustion engine.

BACKGROUND

A motor vehicle conventionally has an internal combustion engine with at least one injector. In particular, wear phenomena or deposits cause injection parameters, such as, for example, the actual opening period or the actual degree of opening of the injector, to change. As a result, the actual injection quantity also changes during the service life of the injector. In order to maintain the strict emission standards and to be able to continue to drive with a high fuel efficiency, the injection system of the internal combustion engine must therefore be capable of injecting a defined fuel quantity precisely over the service life of the injector. This means stringent requirements made of the injection stability and injection accuracy of the injector.

However, since the properties of the injector unavoidably change over its service life, online adaptation of the injection control parameters is necessary.

A known approach for adapting the injection parameters detects a speed signal of the crankshaft and/or of the internal combustion engine. This is due to the fact that if combustion occurs in the internal combustion engine, the engine crankshaft is accelerated. The change in the acceleration is determined by means of the corresponding speed signal, and the injection parameter is corrected.

These known solutions require an operating state of the internal combustion engine in which the fuel supply is switched off, i.e. no normal injection takes place. During this operating state a test injection pulse is implemented and the acceleration is used as an indicator for the injected fuel quantity.

A new approach is described in German application 10 2010 014 320. In said document, the test injection pulse is performed during a normal operating state, preferably during an idling state or an uncoupled state of the internal combustion engine. While the internal combustion engine is in a steady idling state, the rotational speed control (DR) is frozen for at least one injection cycle. "Freezing" means here that the injection parameters for all the normal injection pulses are the same as the injection parameters of the last or preceding injection cycle, apart from the defined test injection pulse. In this way, calibration variants for various transmission types are avoided.

FIGS. 1A and 1B show an injection pattern of such a method plotted against the time t. From FIGS. 1A and 1B it is clear that in the illustrated example an injection cycle comprises four segments (seg0 to seg3). The internal combustion engine is therefore a four-cylinder internal combustion engine.

FIG. 1A shows the normal injection cycle without a test injection pulse during the idling phase. The rotational speed control (DR) is activated. The lack of a test injection pulse is characterized by the reference symbol 1.

FIG. 1B shows the test injection cycle which is a precise copy of the injection configuration of the normal or preceding injection cycle (for example the injection time, the injection position etc.). This means that the rotational speed control (DR) is deactivated for the test injection cycle, that is to say is frozen. The additional test injection pulse in the segment 0 (seg0) is characterized by the reference symbol 3.

The combustion brought about by the test injection pulse is calculated from the difference between the acceleration signal of the first four segments (seg0 to seg3 from FIG. 1A) and the acceleration signal of the following four segments (seg0 to seg3 from FIG. 1B).

FIG. 4A shows an illustration of the combustion signal determined according to the prior art. The injection time $T_i$ is plotted in milliseconds on the x axis, and the combustion signal CMB_STC is plotted on the y axis. The fuel pressure in the injection system is 40 MPa. The combustion effect of a test injection pulse has been determined for five different test injection pulse lengths, wherein the fault bars respectively indicate the standard deviation at the measuring point.

Freezing is performed during the test injection cycle in order to exclude any influence of injection pulses other than the test injection pulse in the test injection cycle on the resulting acceleration signal. Otherwise, the rotational speed control (DR) would, as a reaction to the test injection pulse, falsify the segment times of the segments following the test injection pulse. As a result, the exclusion of this negative influence is performed by selecting precisely the same injection parameters as in the preceding injection cycle. In this case it is ensured that the determined difference between the acceleration signals has been caused solely by the test injection pulse.

However, it is disadvantageous that the method described in this document requires switching off (deactivation or freezing) of the rotational speed control (DR). This increases the complexity of the application software owing to the large number of interactions between the functional assemblies of the speed controller of the internal combustion engine (ENSC) and the implementation of the injection (INJR).

SUMMARY

One embodiment provides an adaptation method of an injector of an internal combustion engine, with which an actually injected fuel quantity is adapted to a setpoint injection quantity, and which has the following steps: (a) actuating (A) the injector with a test injection pulse in at least one segment of an injection cycle, (b) detecting (B) a change in the rotational speed signal based on the test injection pulse in the segment associated with the test injection pulse, and (c) correcting (C) the injected fuel quantity based on the detected change in the rotational speed signal, wherein (d) the method is performed during a normally energized operating state of the internal combustion engine (during the normal ignition phase).

In a further embodiment, the method is performed during an idling state of the internal combustion engine.

In a further embodiment, the detection of a change in the rotational speed signal is performed by (e) detecting (D) a first rotational speed signal in a segment of the injection cycle with a normal injection pulse, (f) detecting (E) a second rotational speed signal in a segment of a subsequent injection cycle with a normal injection pulse and the additional test injection pulse, and (g) comparing (F) the detected first rotational speed signal with the detected second rotational speed signal.

In a further embodiment, the first rotational speed signal and the second rotational speed signal are determined in the same segment of the respective injection cycle.

In a further embodiment, a combustion signal of the test injection pulse is determined from the change in the rotational speed signal of a segment.

In a further embodiment, a statistically relevant value, in particular a mean value, is acquired from a plurality of combustion signals.

In a further embodiment, the actually injected fuel quantity is determined from the combustion signal or the statistically relevant value of the combustion signals.

Another embodiment provides an injection device of an internal combustion engine which comprises a controller for injectors of the internal combustion engine, wherein the controller is designed in terms of programming technology to carry out any of the methods disclosed above.

Another embodiment provides an internal combustion engine including such an injection device.

BRIEF DESCRIPTION OF THE DRAWINGS

Example aspects of the invention are described herein in detail with reference to the drawings, in which:

FIG. 1A shows an injection cycle according to the prior art,

FIG. 1B shows a test injection cycle according to the prior art,

FIG. 2A shows an injection cycle according to one embodiment of the present invention, FIG. 2B shows a test injection cycle according to one embodiment of the present invention.

DETAILED DESCRIPTION

Figure 3:
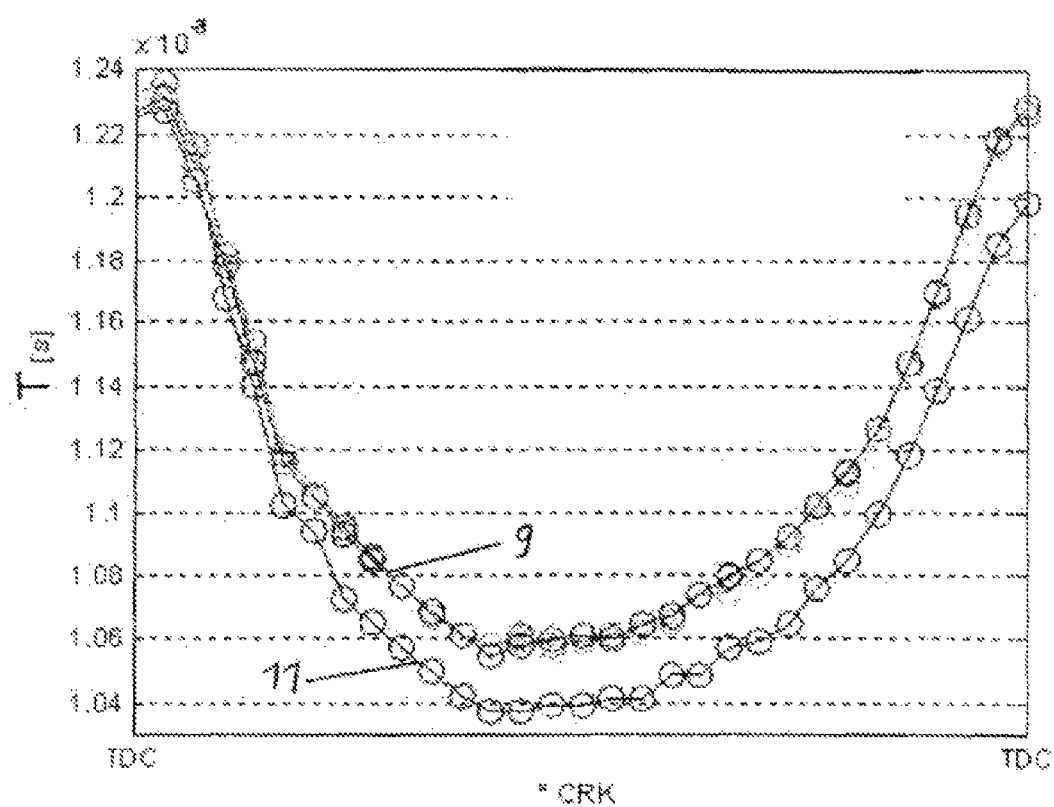
FIG. 3 shows a diagram of the tooth times according to one embodiment of the present invention.

Embodiments of the present disclosure may improve or optimize an adaptation method of an injector, e.g., as compared to conventional techniques discussed above.

Some embodiments provide a method of an injector of an internal combustion engine with which an actually injected fuel quantity is adapted to a setpoint injection quantity has the following steps: actuating the injector with a test injection pulse in at least one segment of an injection cycle, detecting a change in the rotational speed signal based on the test injection pulse in the segment associated with the test injection pulse, and correcting the injected fuel quantity based on the detected change in the rotational speed signal, wherein the method is performed during a normally energized operating state of the internal combustion engine (during the normal ignition phase).

In the disclosed adaptation method, the actually injected fuel quantity is corrected based on the change in the rotational speed signal in the segment of the test injection. In particular, the method is performed during an idling state of the internal combustion engine. It is not necessary in this case to switch off (deactivate or freeze) the rotational speed control (DR). This is due to the fact that the segment times of the segments following the test injection pulse are no longer necessary for the correction of the injected fuel quantity.

The disclosed adaptation method can be applied, for example, in internal combustion engines with what are referred to as common rail injection systems in which a plurality of injectors—typically all the injectors—are supplied with a common fuel line which is at a largely uniformly high pressure. The fuel quantities which are to be injected in each case into each cylinder of the internal combustion engine at the start of a working stroke are primarily metered by virtue of the fact that the injectors are actuated with an actuation period which is selected to be relatively short or relatively long and during which these injectors are opened and inject fuel into the respective cylinder.

Online adaptation of at least one injection control parameter may be performed with the disclosed adaptation method.

One possible advantage of the disclosed adaptation method compared to certain conventional techniques is that the segment times of the segments following the test injection pulse are no longer required, since an acceleration, that is to say the second derivative of the segment times, no longer has to be calculated. The segment time of the segment in which the test injection pulse is implemented and the segment time of one of the preceding segments is sufficient for the calculation.

A further possible advantage is that the rotational speed control (DR) does not have to be deactivated but instead normal work continues. The test injection cycle is therefore not a copy of the normal injection cycle plus the test injection. This simplifies the software structure which is necessary to implement the test injection pulse.

A further possible advantage is that an excessive increase in the speed of the internal combustion engine owing to the test injection pulse is reduced since the rotational speed control (DR) is always active. As a result, the rotational speed or speed of the internal combustion engine will become smooth more quickly in the idling state after the test injection and will settle at the setpoint idling speed or setpoint speed.

Furthermore, in the event of an excessively small acceleration in the segment before the test injection pulse, the rotational speed control (DR) will correct this by requesting a higher torque in the next segment (the segment of the test injection pulse). The difference between the setpoint idling speed and the current rotational speed of the internal combustion engine after the test injection pulse is therefore a reliable indicator of a combustion effect owing to the test injection pulse. This means that the accuracy is improved compared to the prior art.

Furthermore, the calculation method of the combustion as a statistic is simplified based on the difference between the segment times compared to certain conventional techniques and the computing load is reduced.

The detection of a change in the rotational speed signal performed may be performed by the steps: detecting a first rotational speed signal in a segment of the injection cycle with a normal injection pulse, detecting a second rotational speed signal in a segment of a subsequent injection cycle with a normal injection pulse and the additional test injection pulse, and comparing the detected first rotational speed signal with the detected second rotational speed signal. In particular, the first rotational speed signal and the second rotational speed signal are determined in the same segment of the respective injection cycle.

Further, a combustion signal of the test injection pulse may be determined from the change in the rotational speed signal of a segment. The combustion signal corresponds to the effect achieved by the test injection pulse or the corresponding combustion. In particular, a statistically relevant value, in particular a mean value, is acquired from a plurality of combustion signals. The actually injected fuel quantity is then determined from the combustion signal or the statistically relevant value of the combustion signals. Based on the determined actually injected fuel quantity, the actuation data of the injector or injectors of the internal combustion engine is subsequently corrected or adapted in such a way that the defined fuel quantity or setpoint fuel quantity is injected precisely over the service life of the injector.

Other embodiments provide an injection device of an internal combustion engine comprising a controller for injectors of the internal combustion engine, wherein the controller is designed in terms of programming technology to carry out the disclosed adaptation method. In this way, the injection device may provide any of the above-described advantages of the disclosed adaptation method.

Other embodiments provide an internal combustion engine according comprising an injection device as discussed herein. The internal combustion engine may thus provide any of the advantages of the disclosed adaptation method.

An embodiment of the adaptation method is described below in which a test injection is performed during which a rotational speed control (DR) is in an active state.

FIGS. 2A and 2B show an injection pattern of such an adaptation method plotted against the time t. From FIGS. 2A and 2B it is apparent that in the illustrated example an injection cycle comprises four segments (seg0 to seg3). The internal combustion engine is therefore an internal combustion engine with four cylinders.

FIG. 2A shows the normal injection cycle without the test injection pulse during the idling phase. The rotational speed control (DR) is activated. The lack of a test injection pulse is characterized by the reference symbol 5.

FIG. 2B shows the test injection cycle. The rotational speed control (DR) is activated during the test injection cycle. The additional test injection pulse in the segment 0 (seg0) is characterized by the reference symbol 7. Since the rotational speed control (DR) is activated during the test injection cycle, the rotational speed control (DR) in the segment following the test injection, here the segment 1 (seg1) will reduce the injection in such a way that a setpoint idling speed is reached as quickly as possible. The single injection pulse, which has been previously defined with respect to its duration and with respect to its start, is therefore the test injection pulse.

During the idling state of the internal combustion engine it is not necessary to use the segment times of the segments following the segment with the test injection. For the case shown in FIGS. 2A and 2B this means that only the segment time of the segment 0 (seg0) in the test injection cycle and in the preceding normal injection cycle has to be known. It is, however, also sufficient if the segment time of another segment is known from the normal injection cycle.

A combustion signal SIG_CMB can be determined, for example, by means of the following equation:

$$SIG\_CMB = \Delta T\_SEG = t\_seg\_0(tc) - t\_seg\_0(nc).$$

The combustion signal SIG_CMB therefore corresponds to a segment time difference $\Delta T\_SEG$. The segment time difference $\Delta T\_SEG$ is determined in the present example from the segment time of the segment 0 in the test cycle $t\_seg\_0(tc)$ and the segment time of the segment 0 in the normal injection cycle $t\_seg\_0(nc)$.

FIG. 3 shows the tooth times T for the four segments seg0 to seg3 of the normal injection cycle (NC). The segment times of the segments seg0 to seg3 of the normal injection cycle are virtually the same and are therefore characterized jointly by the reference symbol 9.

Furthermore, the tooth time T of the first segment seg0 of the test injection cycle (TC), that is to say the segment with the test injection, is illustrated. This curve profile was characterized with the reference symbol 11. The crankshaft angle is given in degrees ° CRK on the x axis, and the tooth time T in seconds on the y axis. The tooth time T in present case is the time which the crankshaft needs to rotate through 6°. The test injection takes place approximately at the top dead center (TDC).

Since on average no acceleration or braking occurs during the idling state, the combustion signal SIG_CMB has a similar accuracy to the variable used for this purpose in the prior art, specifically the second derivative of the segment time (the acceleration).

Figure 4A:
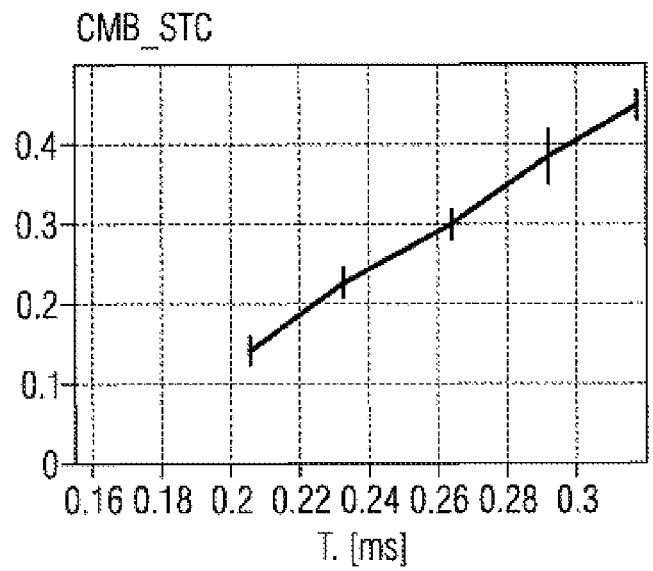
FIG. 4A shows an illustration of the combustion signal determined according to the prior art.
Figure 4B:
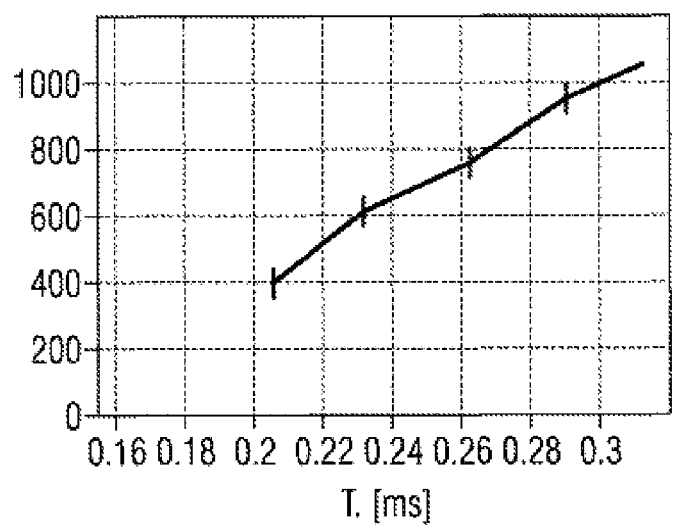
FIG. 4B shows an illustration of the combustion signal determined according to one embodiment of the invention.

The comparable quality of the segment time difference $\Delta T\_SEG$ and the second derivative of the segment time (referred to as CMB_STC) is apparent from FIGS. 4A and 4B. An analysis of the combustion effect owing to a test injection pulse with a period $T_i$ was performed therein. The combustion effect of a test injection pulse was determined for five different test injection pulse lengths. The fault bars indicate the standard deviation at the respective measuring points. The combustion signals CMB_STC (FIG. 4A) and SIG_CMB (FIG. 4B) are plotted on the y axis, while the length of the test injection pulse $T_i$ is plotted in milliseconds on the x axis. Furthermore, the second derivative of the segment time is illustrated in FIG. 4A (prior art), while the combustion signal SIG_CMB according to an embodiment of the invention is plotted in FIG. 4B.

The text which follows explains why the active rotational speed control (DR) does not give rise to an incorrect calculation of the combustion effect. The rotational speed control (DR) will only change the speed of the internal combustion engine after it has detected the segment time difference. However, the disclosed adaptation method merely uses the segment time difference which was caused by the injected fuel quantity and is not influenced by the rotational speed control (DR). FIG. 4B therefore shows that the segment time difference $\Delta T\_SEG$ has sufficient stability and accuracy compared to the prior art according to FIG. 4A.

Figure 5:
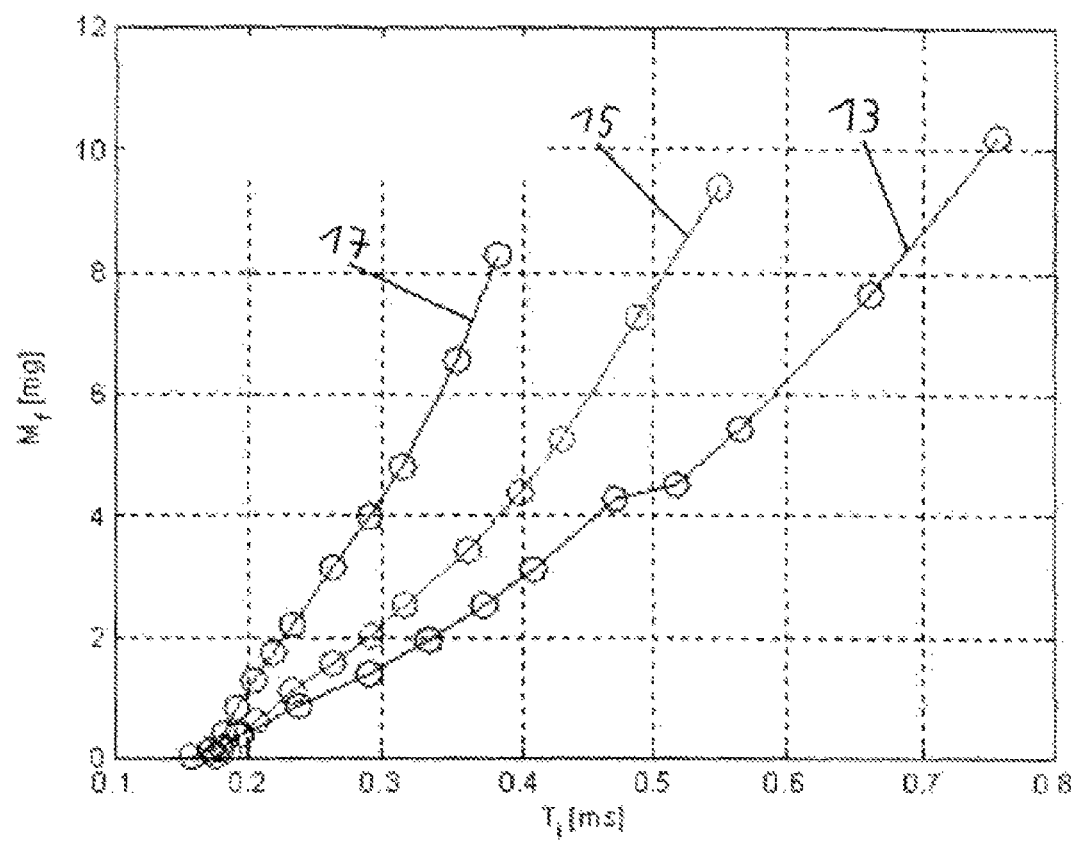
FIG. 5 shows a graphic illustration of the relationship between the length of the injection period and the injected fuel quantity.

FIG. 5 shows a graphic illustration of the relationship between the injection period $T_i$ and the injected fuel quantity $M_f$ as a function of the prevailing fuel pressure. The injection period $T_i$ is plotted on the x axis in milliseconds, while the injected fuel quantity $M_f$ is plotted on the y axis in milligrams. The characteristic curve which is provided with the reference symbol 13 is obtained at a fuel pressure of 250 bar, the characteristic curve provided with the reference symbol 15 is obtained at a fuel pressure of 400 bar, and the characteristic curve provided with the reference symbol 17 is obtained at a fuel pressure of 800 bar. FIG. 5 is also referred to as an injection characteristic diagram.

Figure 6:
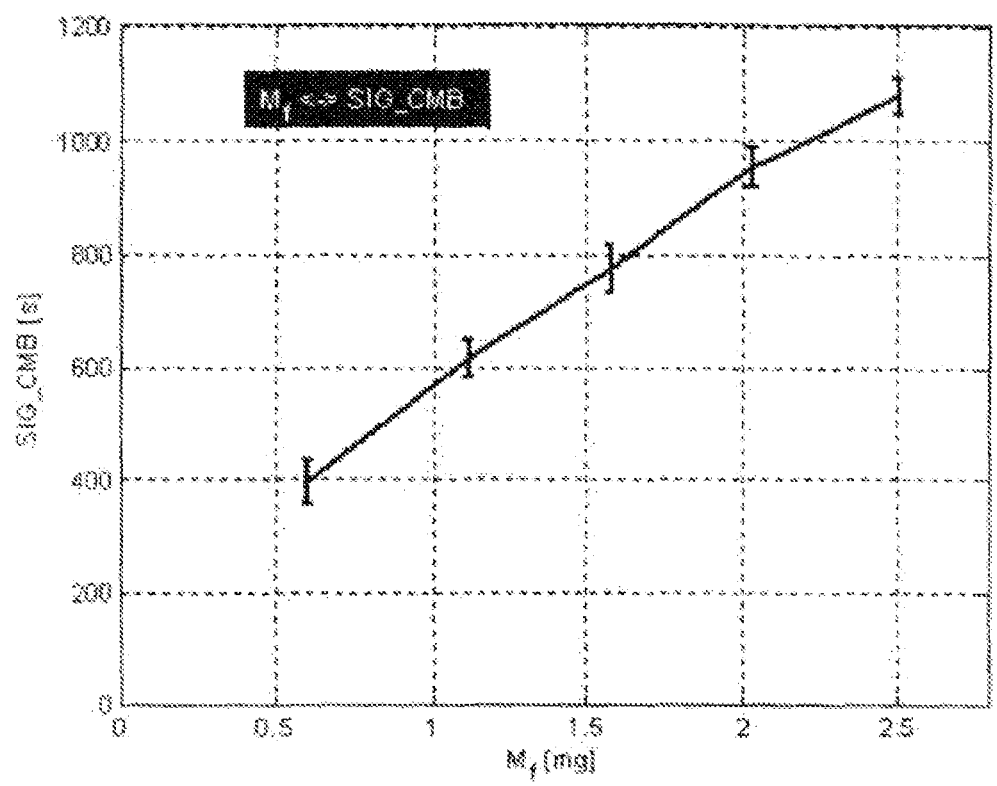
FIG. 6 shows a graphic illustration of the relationship between the combustion signal and the associated injected fuel quantity.

A correlation between the actually injected fuel quantity and the segment time difference is illustrated in FIG. 6. In this context, the injected fuel quantity $M_f$ is plotted in milligrams on the x axis, and the combustion signal SIG_CMB is plotted in seconds on the y axis. The correlation between the combustion signal and the injected fuel quantity can be acquired experimentally by combining the injection characteristic diagram from FIG. 5 with the measured combustion signal SIG_CMB as illustrated in FIG. 4B. The use of a well-calibrated characteristic diagram according to FIG. 6 makes it possible to place the measured combustion signal in a relationship with the injected fuel quantity and in this way determine the test injection pulse period. It is therefore in turn possible for the characteristic diagram according to FIG. 5 to be adapted over the service life of the injector.

Figure 7:
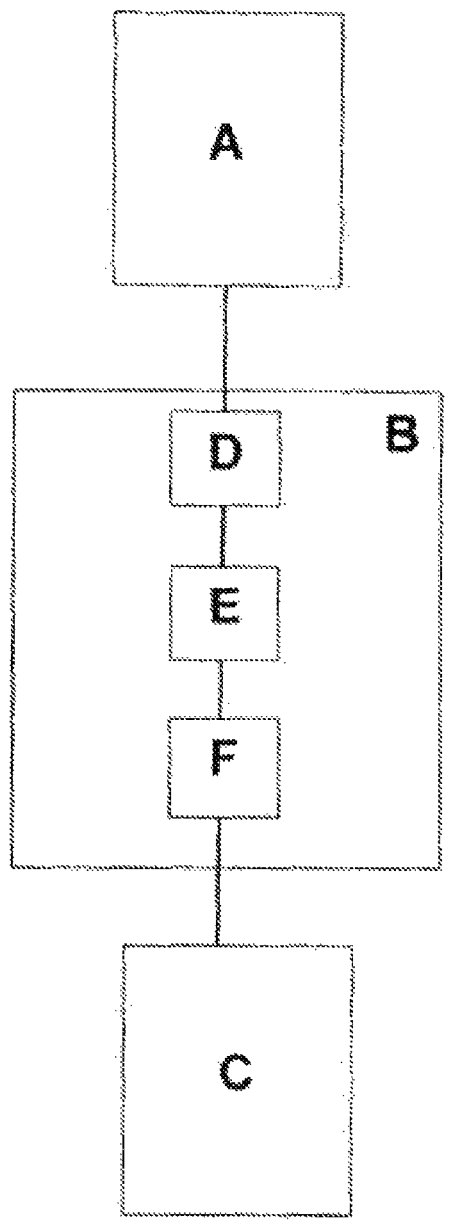
FIG. 7 shows a schematic method sequence of an adaptation method according to one embodiment of the invention.

Referring to FIG. 7, the method sequence of an adaptation method according to one embodiment is illustrated schematically. In step A, the injector is actuated with a test injection pulse. A change in the rotational speed signal based on the test injection pulse is detected in step B. The detection of the change takes place here in such a way that firstly in step D a first rotational speed signal in a segment of the injection cycle is detected with a normal injection pulse. This is, for example, the segment 0 (seg0) of the normal injection cycle according to FIG. 2A. In a following step E, a second rotational speed signal in a segment of a subsequent injection cycle with a normal injection pulse and the additional test injection pulse is detected. For example this is the segment 0 (seg0) of the test injection cycle according to FIG. 2B. In step F, the comparison of the detected first rotational speed signal with the detected second rotational speed signal subsequently takes place. The change in the rotational speed signal takes place based on the comparison. A correction in the injected fuel quantity is performed based on the detected change in the rotational speed signal in step C.

What is claimed is:

1. An adaptation method of an injector of an internal combustion engine, with which an actually injected fuel quantity is adapted to a setpoint injection quantity, the method comprising:
   actuating the injector with a test injection pulse in at least one segment of an injection cycle during an active fuel injection operating state of the internal combustion engine with an active rotational speed control, and
   detecting a first rotational speed signal in a segment of the injection cycle with a normal injection pulse,
   detecting a second rotational speed signal in a segment of a subsequent injection cycle with a normal injection pulse and the additional test injection pulse,
   wherein the first rotational speed signal and the second rotational speed signal are determined in the same segment of the respective injection cycle, and
   comparing the detected first rotational speed signal with the detected second rotational speed signal,
   correcting the injected fuel quantity based on the detected change in the rotational speed signal, wherein
   wherein the method is performed during a normally energized operating state of the internal combustion engine.

2. The adaptation method of claim 1, wherein the method is performed during an idling state of the internal combustion engine.

3. The adaptation method of claim 1, comprising determining a combustion signal of the test injection pulse from the change in the rotational speed signal of a segment.

4. The adaptation method of claim 3, comprising determining a mean value of a plurality of combustion signals.

5. The adaptation method of claim 4, comprising determining the actually injected fuel quantity based on the combustion signal or the mean value of the combustion signals.

6. An injection device of an internal combustion engine, comprising:
   a controller for injectors of the internal combustion engine,
   wherein the controller comprises logic instructions stored in non-transitory computer-readable media and executable by a processor to perform an adaptation method of an injector during an active fuel injection operating state of the internal combustion engine, including the following steps:
      actuate the injector with a test injection pulse in at least one segment of an injection cycle during an active fuel injection operating state of the internal combustion engine,
      detect a change in the rotational speed signal based on the test injection pulse in the segment associated with the test injection pulse by:
         detecting a first rotational speed signal in a segment of the injection cycle with a normal injection pulse,
         detecting a second rotational speed signal in a segment of a subsequent injection cycle with a normal injection pulse and the additional test injection pulse, and
         comparing the detected first rotational speed signal with the detected second rotational speed signal, wherein the first rotational speed signal and the second rotational speed signal are determined in the same segment of the respective injection cycle, and
      correct the injected fuel quantity based on the detected change in the rotational speed signal.

7. The injection device of claim 6, wherein the controller is configured to perform the adaptation method of the injector during an idling state of the internal combustion engine.

8. The injection device of claim 6, wherein the controller is configured to determine a combustion signal of the test injection pulse from the change in the rotational speed signal of a segment.

9. The injection device of claim 8, wherein the controller is configured to determine a mean value of a plurality of combustion signals.

10. The injection device of claim 9, wherein the controller is configured to determine the actually injected fuel quantity based on the combustion signal or the mean value of the combustion signals.

11. An internal combustion engine, comprising:
    an injection device comprising a controller for injectors of the internal combustion engine,
    wherein the controller comprises logic instructions stored in non-transitory computer-readable media and executable by a processor to perform an adaptation method of an injector during an active fuel injection operating state of the internal combustion engine, including the following steps:

actuate the injector with a test injection pulse in at least one segment of an injection cycle during the active fuel injection operating state of the internal combustion engine, detect a change in the rotational speed signal based on the test injection pulse in the segment associated with the test injection pulse, by:

detecting a first rotational speed signal in a segment of the injection cycle with a normal injection pulse, detecting a second rotational speed signal in a segment of a subsequent injection cycle with a normal injection pulse and the additional test injection pulse, wherein the first rotational speed signal and the second rotational speed signal are determined in the same segment of the respective injection cycle, and comparing the detected first rotational speed signal with the detected second rotational speed signal, and correct the injected fuel quantity based on the detected change in the rotational speed signal.

12. The internal combustion engine of claim 11, wherein the controller is configured to perform the adaptation method of the injector during an idling state of the internal combustion engine.

13. The internal combustion engine of claim 11, wherein the controller is configured to determine a combustion signal of the test injection pulse from the change in the rotational speed signal of a segment.

14. The internal combustion engine of claim 13, wherein the controller is configured to determine a mean value of a plurality of combustion signals.

\* \* \* \* \*